(12) United States Patent
Yoon et al.

(10) Patent No.: US 8,670,939 B2
(45) Date of Patent: Mar. 11, 2014

(54) APPARATUS AND METHOD OF PROVIDING FACILITY INFORMATION

(75) Inventors: Chang-Rak Yoon, Daejeon (KR); Kyung-Ok Kim, Daejeon (KR); Jong-Hyun Park, Daejeon (KR); Hak-Cheol Kim, Daejeon (KR); Ki-Jung Lee, Yongin-si (KR); Jae-Chul Kim, Daejeon (KR); Yoon-Seop Chang, Daejeon (KR); Sun-Rae Park, Daejeon (KR); Seong-Ho Lee, Daejeon (KR); Jae-Jun Yoo, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 654 days.

(21) Appl. No.: 12/963,205

(22) Filed: Dec. 8, 2010

(65) Prior Publication Data
US 2011/0153215 A1    Jun. 23, 2011

(30) Foreign Application Priority Data

Dec. 18, 2009  (KR) .......................... 10-2009-0126713
Mar. 8, 2010  (KR) .......................... 10-2010-0020297

(51) Int. Cl.
*G06F 19/00* (2011.01)

(52) U.S. Cl.
USPC ............................... 702/5; 702/188; 705/10

(58) Field of Classification Search
USPC ......... 702/5, 6, 85, 182, 183, 188; 455/456.1; 340/539.13; 705/10
See application file for complete search history.

(56) References Cited

U.S. PATENT DOCUMENTS

| 7,143,011 B2 * | 11/2006 | Yoshie et al. ................. 702/188 |
| 8,502,659 B2 * | 8/2013 | Richey et al. ............ 340/539.13 |
| 2002/0178047 A1 * | 11/2002 | Or et al. .......................... 705/10 |
| 2008/0147325 A1 | 6/2008 | Maassel et al. |

FOREIGN PATENT DOCUMENTS

| KR | 10-2003-0050539 | 6/2003 |
| KR | 10-2005-0078136 | 8/2005 |
| KR | 10-2006-0006467 | 1/2006 |
| KR | 10-2008-0029407 | 4/2008 |
| KR | 10-2009-000186 | 1/2009 |
| KR | 10-2009-0062748 | 6/2009 |
| KR | 10-2009-0070900 | 7/2009 |

* cited by examiner

*Primary Examiner* — John H Le
(74) *Attorney, Agent, or Firm* — Staas & Halsey LLP

(57) ABSTRACT

Provided are an apparatus and method of providing facility information that may correct inaccurate information on a facility using site information and provide the corrected information in an augmented reality manner. A facility information providing apparatus according to an exemplary embodiment of the present invention including: a site information analyzing unit that analyzes site information to identify a site facility; a facility information searching unit that retrieves facility information corresponding to the site information; a facility information mapping unit that maps the facility information with the site facility and corrects the facility information based on a mapped result to generate corrected facility information; and an augmented reality providing unit that synthesizes the corrected facility information with the site information to generate augmented reality information.

20 Claims, 4 Drawing Sheets

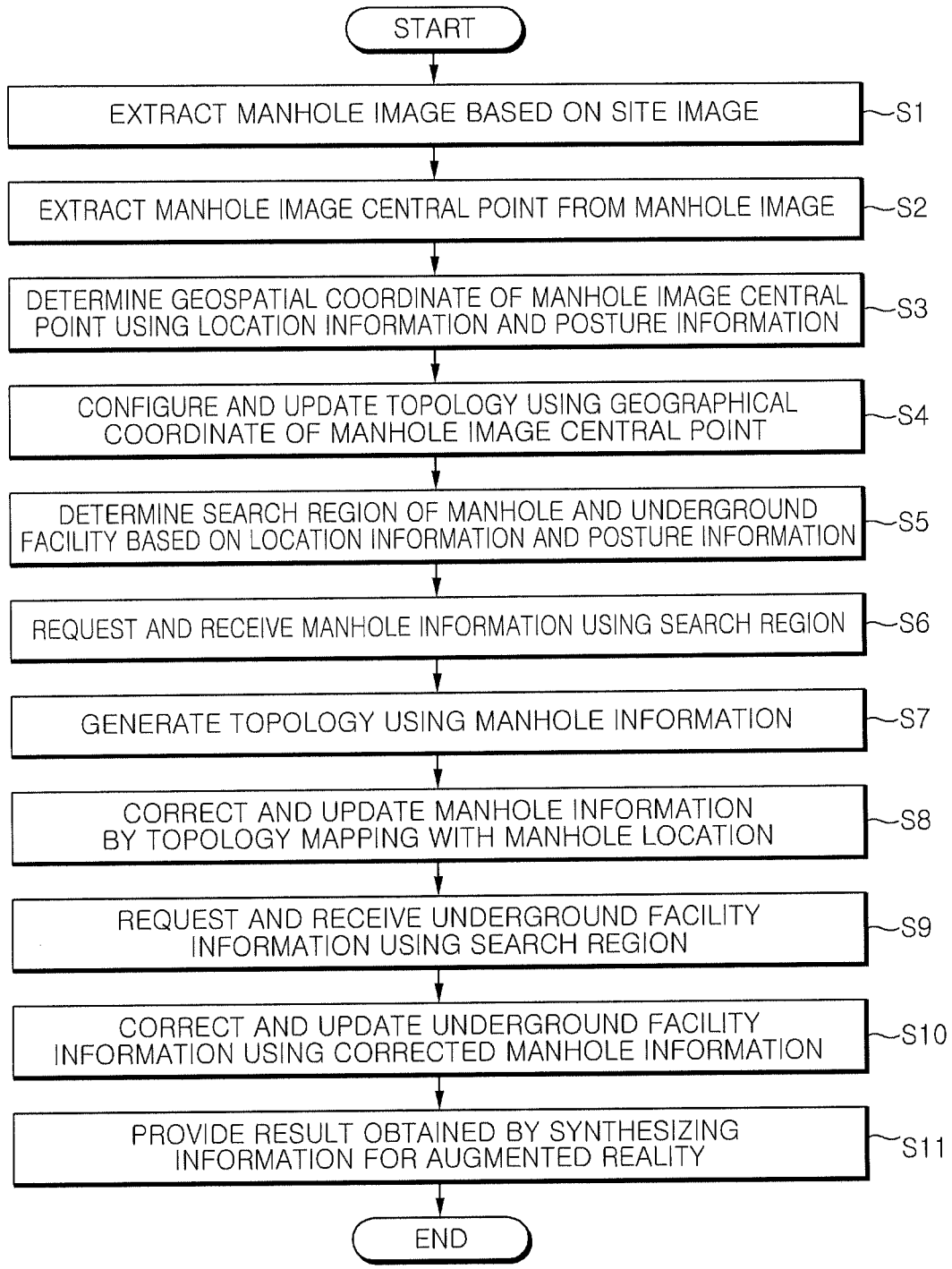

APPARATUS AND METHOD OF PROVIDING FACILITY INFORMATION

CROSS REFERENCE TO RELATED APPLICATIONS

This application claims the benefit of Korean Patent Application Nos. 10-2009-0126713 filed on Dec. 18, 2009 and 10-2010-0020297 filed on Mar. 8, 2010, in Korean Intellectual Property Office, which are hereby incorporated by reference in their entirety into this application.

BACKGROUND OF THE INVENTION

1. Field of the Invention

The present invention relates to an apparatus and method of providing facility information, and more particularly, to an apparatus and method of providing facility information that may correct inaccurate information on a facility using site information and provide the corrected information in an augmented reality manner so that the facility may be effectively managed.

2. Description of the Related Art

In general, underground facilities, such as, for example, water supply facilities, sewage facilities, electrical facilities, gas facilities, communication facilities, oil pipelines, and room heating pipelines, are closely related in respect to convenience and safety of human life, and various technologies have been developed to effectively manage the underground facilities.

However, underground facility information regarding the underground facilities are inaccurate in many cases, and information, such as the location or features of the underground facilities, is not easy to visually identify since the underground facilities are generally buried underground. Thus, it is difficult to effectively manage the underground facilities.

SUMMARY OF THE INVENTION

The present invention has been made in an effort to effectively provides synthesized information of site information and facility information to a user using an augmented reality technology.

Specifically, the present invention has been made in an effort to provide an apparatus and method of providing facility information that may correct inaccurate information on a facility using site information and provide the corrected information in an augmented reality manner so that the facility may be effectively managed.

Further, the present invention has been made in an effort to provides acquiring site information including location information, posture information, and image information, extracting manhole information based on the site information, mapping stored manhole information and underground facility information with the site information, and synthesizing the site information with the mapped underground facility information, and providing the synthesized information.

Further, the present invention has been made in an effort to provides a method of mapping inaccurate underground facility information based on the manhole information of the site information to provide augmented underground facility information based on the site information.

An exemplary embodiment of the present invention provides a facility information providing apparatus including: a site information analyzing unit that analyzes site information to identify a site facility; a facility information searching unit that retrieves facility information corresponding to the site information; a facility information mapping unit that maps the facility information with the site facility and corrects the facility information based on a mapped result to generate corrected facility information; and an augmented reality providing unit that synthesizes the corrected facility information with the site information to generate augmented reality information.

The site information may includes location information, posture information, and image information. The facility information may includes manhole information and underground facility information.

The site facility may includes a manhole, and the site information analyzing unit determines a geospatial coordinate using location information, posture information, and image information of the manhole to configure a geographic coordinate-based topology of the manhole.

The facility information searching unit may searches manhole information using location information and posture information for the manhole and configures manhole information-based topology of the manhole based on the manhole information.

The facility information mapping unit may maps the geographic coordinate-based topology of the manhole and the manhole information-based topology of the manhole to each other to generate corrected manhole information.

The site facility may includes an underground facility, and the facility information searching unit searches underground facility information using location information and posture information of the underground facility, and the facility information mapping unit maps the corrected manhole information with the underground facility information to generate corrected underground facility information.

Determining the geospatial coordinate may includes extracting a central point of the manhole using location information, posture information, and image information for the manhole and determining the geospatial coordinate from the central point of the manhole.

The facility information mapping unit may determines a search region using the location information and the posture information, and the facility information searching unit may retrieves facility information based on the search region.

The underground facility information may includes information on a water supply facility, a sewage facility, an electrical facility, a gas facility, a communication facility, an oil pipeline, and a room heating pipeline, and the manhole information corresponds to the underground facility information.

Another exemplary embodiment of the present invention provides a method of providing facility information including: analyzing site information to identify a site facility; searching facility information corresponding to the site information; mapping the facility information with the site facility and correcting the facility information based on a mapped result to generate corrected facility information; and synthesizing the corrected facility information with the site information to generate augmented reality information.

According to the exemplary embodiments of the present invention, it may provide augmented underground facility information based on site information by acquiring the site information including location information, posture information, and image information, extracting manhole information based on the site information, mapping stored manhole information and underground facility information with the site information to provide corrected information.

Further, according to the exemplary embodiments of the present invention, it may provide underground facility information conforming to the site information by performing mapping on the underground facility information based on the site information to correct the information rather than by simply synthesizing the site information with the underground facility information to display the simply synthesized information, which may display inaccurate information.

BRIEF DESCRIPTION OF THE DRAWINGS

FIG. 5 is a view illustrating an applicable example of a method of providing facility information according to an exemplary embodiment of the present information.

DETAILED DESCRIPTION OF THE PREFERRED EMBODIMENTS

Hereinafter, exemplary embodiments of the present invention will be described in detail with reference to the accompanying drawings.

Figure 1:
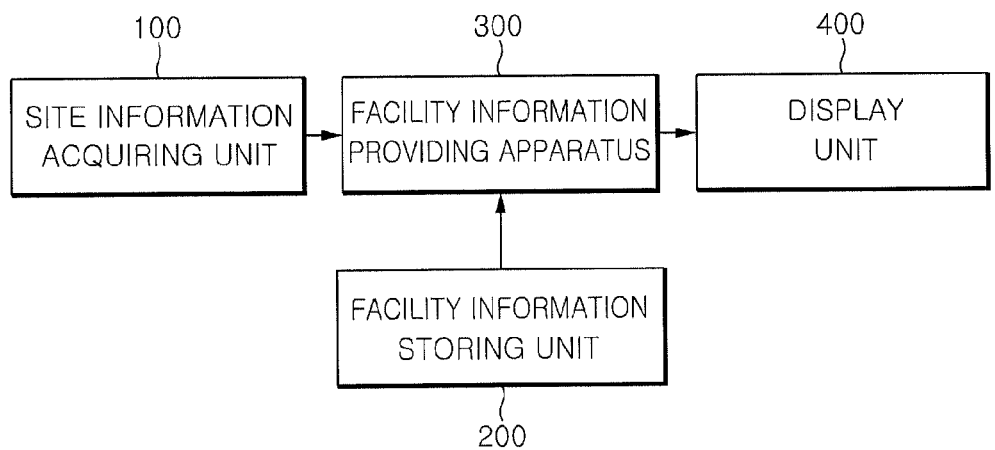
FIG. 1 is a view illustrating an entire configuration of a facility information providing apparatus according to an exemplary embodiment of the present invention.

FIG. 1 is a view illustrating an entire configuration of a facility information providing apparatus according to an exemplary embodiment of the present invention.

Referring to FIG. 1, an entire configuration including a facility information providing apparatus according to an exemplary embodiment of the present invention includes a site information acquiring unit 100, a facility information storing unit 200, a facility information providing apparatus 300, and a display unit 400.

The site information acquiring unit 100 acquires site information on a site facility and provides the site information to the facility information providing apparatus 300 according to an exemplary embodiment of the present invention. Here, the site information preferably includes an image of the site facility or information on the location of the site facility or information on a sensed posture. Also, the site facility may include, but not limited to, a manhole or an underground facility.

Here, the site information acquiring unit 100 may include a location information acquiring unit (not shown), such as a GPS, that may sense the location of the current facility, a posture information acquiring unit (not shown), such as an IMU (Inertial Measurement Unit), that may sense the posture of the site facility, and an image information acquiring unit (not shown), such as a stereo camera, that may acquire an image of the site facility.

The method of acquiring the location, posture, and image may be apparently understood by a person having ordinary skill in the art from known technologies. And, the location information, the posture information, and the image information, which are acquired by the site information acquiring unit 100, are stored and managed in an inner storage device.

The facility information storing unit 200 stores pre-collected underground facility information and manhole information that includes the installed location and posture of the facility. The underground facility information may include information on an underground facility, such as, for example, a water supply facility, a sewage facility, an electric facility, a gas facility, a communication facility, an oil pipeline, and a room heating pipeline. Further, the facility information storing unit 200 may store, manage, and provide the underground facility information and the manhole information using various storing methods, such as a GIS (Geographic Information System) database.

The facility information providing apparatus 300 identifies a site facility, for example, a manhole, based on the site information including the location information, the posture information, and the image information, maps the pre-stored facility information, for example, the manhole information with the site information, and corrects the inaccurate, pre-stored manhole information and underground facility information. That is, the facility information providing apparatus 300 extracts the manhole information based on the site information including the location information, the posture information, and the image information and maps the pre-stored manhole information based on actual information, i.e., the extracted manhole information so that incorrect part of the pre-stored manhole information can be corrected. In this case, the facility information providing apparatus 300 maps the corrected manhole information with the pre-stored underground facility information so that incorrect part of the pre-stored underground facility information may be corrected. For example, in the case of a sewage facility, the sewage pipeline is buried underground, but the manhole is exposed outwards. The facility information providing apparatus 300 corrects the manhole information of the sewage facility based on the site information. And, the facility information providing apparatus 300 maps the preset underground facility information on the sewage facility based on the corrected manhole information to adjust the incorrect information of the sewage facility connected to the sewage pipeline, and the underground facility information may be thereby corrected.

Also, the facility information providing apparatus 300 synthesizes the corrected facility information with the site information to generate augmented reality information and provides the augmented reality information to the display unit 400. Here, the "augmented reality information" is information for using an augmented reality technology. The augmented reality technology provides mixed information of actual information and virtual information to a user so that the user may effectively receive various reality-based information. The augmented reality technology is well known to a person having ordinary skill in the art, and thus, the detailed description will be omitted.

As such, the facility information providing apparatus 300 may provide the corrected facility information based on the site information by the augmented reality technology so that spatial information necessary for human life may be effectively managed.

The display unit 400 displays the augmented reality information provided from the facility information providing apparatus 300.

The display unit 400 may include various display unit, such as a stereoscopic monitor. That is, the display unit provides the facility information synthesized with the site information including the location information, the posture information, and the image information in the form of augmented reality.

In the meantime, it is preferable that all the information generated according to an exemplary embodiment of the present invention is stored in a storing unit (not shown) so the stored information may be reused afterwards.

Figure 2:
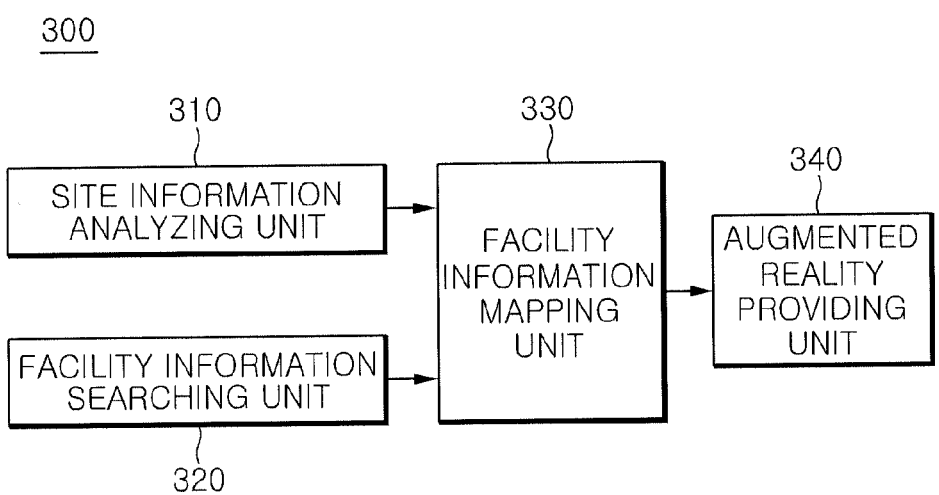
FIG. 2 is a view illustrating an inner configuration of the facility information providing apparatus shown in FIG. 1.
Figure 3:
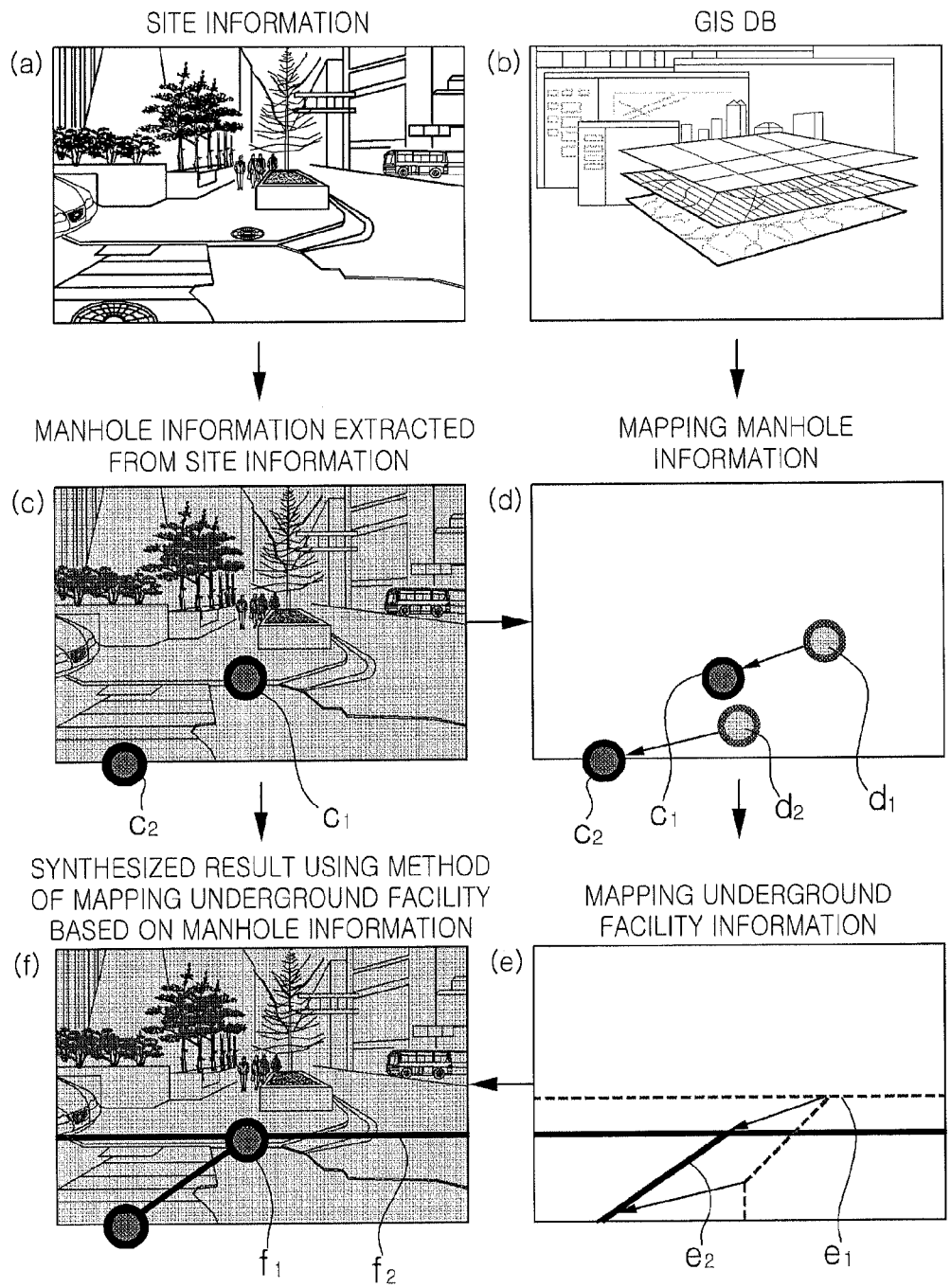
FIG. 3 is a view illustrating an example of a method of providing facility information according to an exemplary embodiment of the present invention.

FIG. 2 is a view illustrating an inner configuration of the facility information providing apparatus shown in FIG. 1, and FIG. 3 is a view illustrating an example of a method of providing facility information according to an exemplary embodiment of the present invention.

Referring to FIGS. 2 and 3, the facility information providing apparatus according to an exemplary embodiment of the present invention includes a site information analyzing unit 310, a facility information searching unit 320, a facility information mapping unit 330, and an augmented reality providing unit 340.

First of all, the site information analyzing unit 310 analyzes site information to identify a site facility, for example, a manhole or underground facility. As described above, the site information includes location information, posture information, and image information on the site facility (Refer to FIG. 3A). In case of finding a manhole of a site, the site information analyzing unit 310 analyzes the location, the posture, and the image from the acquired site information and identifies the manhole from the site to extract manhole information.

Here, the site information analyzing unit 310, as shown in FIG. 3C, determines a geospatial coordinate based on the location information, the posture information, and the image information on the exemplified manhole to configure geographic coordinate-based topology (c1, c2) of the manhole. Methods of configuring the geographic coordinate-based topology are apparent to a person having ordinary skill in the art from known technologies, and thus the detailed description will be omitted. In this case, in order to determine a geospatial coordinate, the site information analyzing unit 310 may employ a scheme of extracting the central point of the manhole using the location information, the posture information, and the image information on the manhole and determining a geospatial coordinate from the central point of the manhole.

Next, the facility information searching unit 320 searches pre-stored facility information corresponding to the site information, for example, from the GIS DB shown in FIG. 3B. Here, the facility information searching unit 320, as shown in FIG. 3D, searches the manhole information using the location information and the posture information regarding the manhole and configures manhole information-based topology (d1, d2) based on the searched manhole information. Methods of configuring the topology are apparent to a person having ordinary skill in the art from known technologies, and thus the detailed description will be omitted. As described above, the underground facility information includes information on a water supply facility, a sewage facility, an electric facility, a gas facility, a communication facility, an oil pipeline, and a room heating pipeline, and the manhole information includes the location of a manhole corresponding to the underground facility information.

Also, the facility information mapping unit 330 determines a search region using the location information and the posture information and requests the facility information searching unit 320 to send facility information corresponding to the determined search region. Then, the facility information searching unit 320 may search facility information based on the search region. For example, as the facility information mapping unit 330 determines a search region based on the location and posture of the image shown in FIG. 3A, the facility information searching unit 320 searches pre-stored facility information corresponding to the search region. Such a search method is apparent to a person having ordinary skill in the art from known technologies, and thus the detailed description will be omitted. By doing so, the facility information may be exactly searched and information search time unnecessary for facility information search may be previously reduced.

Subsequently, the facility information mapping unit 330, as shown in FIG. 3D, maps the facility information with the site facility and corrects the facility information based on a mapped result to generate corrected facility information. Here, the facility information mapping unit 330 maps the geographic coordinate-based topology (c1, c2) of the manhole with the manhole information-based topology (d1, d2) to generate the corrected manhole information. For example, the location of the manhole, which is included in the pre-stored manhole information, and the location of the manhole, which is extracted from the site information, are compared to each other, and if the two are different from each other, the location information of the manhole included in the pre-stored manhole information is corrected to the location information of the manhole extracted from the site information.

Further, the facility information searching unit 320, as shown in FIG. 3E, searches underground facility information (e1) using the location information and the posture information of an underground facility, and the facility information mapping unit 330 maps the corrected manhole information with the underground facility information to generate corrected underground facility information (e2).

Next, the augmented reality providing unit 340, as shown in FIG. 3F, synthesizes the corrected facility information (f1, f2) with the site information to generate augmented reality information.

Figure 4:
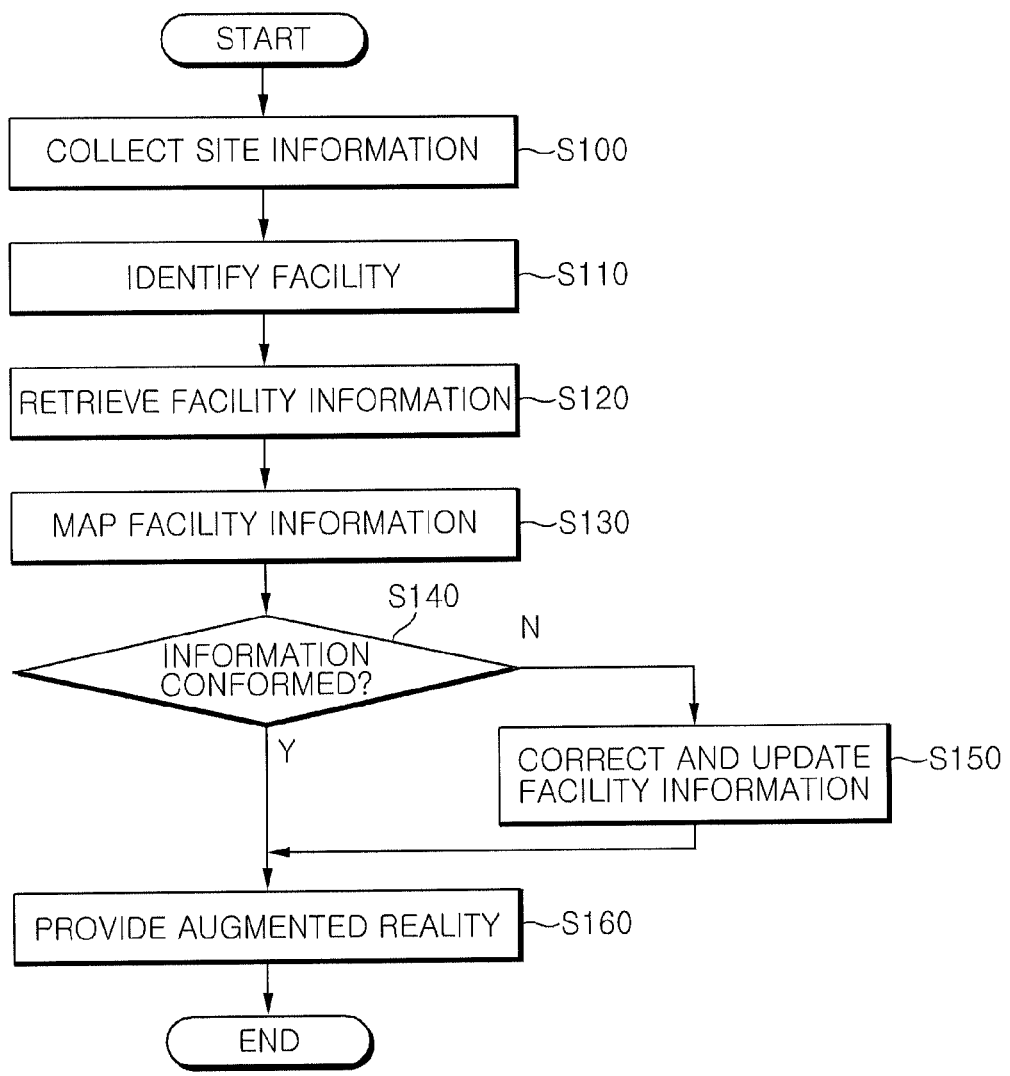
FIG. 4 is a flowchart illustrating a method of providing facility information according to an exemplary embodiment of the present invention.

FIG. 4 is a flowchart illustrating a method of providing facility information according to an exemplary embodiment of the present invention.

A method of providing facility information according to an exemplary embodiment of the present invention will be described in connection with FIG. 4. In this exemplary embodiment, the site facility will be described as being a manhole and an underground facility.

To begin with, the facility information providing apparatus 300 collects the site information including the location information, the posture information, and the image information from the site information acquiring unit 100 (S100). And, the facility information providing apparatus 300 identifies a manhole using the collected site information (S110). Here, the facility information providing apparatus 300 may identify the manhole by determining a geospatial coordinate of the central point of the manhole and configuring topology based on the geographic coordinate of the central point of the manhole, as described above.

The facility information providing apparatus 300 requests the facility information storing unit 200 to send manhole information using the location information and the posture information, receives the manhole information, and configures topology based on the received manhole information (S120).

Next, the facility information providing apparatus 300 performs topology mapping with the location of the manhole using the geographic coordinate-based topology and the manhole information-based topology (S130).

Subsequently, the facility information providing apparatus 300 determines whether the information mapped in step S130 conforms to each other, and if not conformed (S140: N), corrects the manhole information. Upon correcting the manhole information, the facility information providing apparatus 300 requests the facility information storing unit 200 to send the underground facility information using the location information and the posture information, receives the underground facility information, and corrects the received underground facility information using the corrected manhole information (S150).

Next, the facility information providing apparatus 300 synthesizes the location information, the posture information, the image information, the corrected manhole information, and the underground facility information to generate augmented reality information and provides the generated augmented reality information to the display unit 400 so that the display unit 400 may display the augmented reality information.

If in step S140, the information mapped in step S130 conforms to each other (S140: Y), then the facility information providing apparatus 300 synthesizes the site information with the pre-stored facility information or facility information extracted from the site information to generate augmented reality information and provides the generated augmented reality information to the display unit 400 so that the display unit 400 may display the augmented reality information. Further, the facility information providing apparatus 300 stores the manhole image, the manhole image central point, the manhole image central point geographic coordinate, the manhole image central point topology, the corrected manhole information, and the corrected facility information to a storing unit (not shown).

FIG. 5 is a view illustrating an applicable example of a method of providing facility information according to an exemplary embodiment of the present information. As described in connection with FIG. 4, the site facility is described as being a manhole and an underground facility.

Referring to FIG. 5, the facility information providing apparatus 300 extracts manhole image from two or more overlay-captured images acquired from the site information acquiring unit 100 (S1).

Thereafter, the facility information providing apparatus 300 extracts the manhole image central point from the extracted manhole image extracted in step S1 (S2) and determines a geospatial coordinate of the extracted manhole image central point using the location information and the posture information from the site information acquiring unit 100 (S3).

Subsequently, the facility information providing apparatus 300 configures topology based on the determined geospatial coordinate of the manhole image central point (S4).

Moreover, the facility information providing apparatus 300 determines a search region within the facility information storing unit 200 which searches the manhole information and the underground facility information using the location information and the posture information acquired from the site information acquiring unit 100 (S5).

Then, the facility information providing apparatus 300 requests the facility information storing unit 200 to search the manhole information using the search region determined in step S5 and receives the searched manhole information from the facility information storing unit 200 (S6).

Subsequently, the facility information providing apparatus 300 configures topology using the searched manhole information (S7).

Then, the facility information providing apparatus 300 performs topology matching with the location of the manhole using the topology of the manhole image central point that is a result obtained in step S4 and the topology of the manhole information that is a result obtained in step S7 to correct the manhole information to match the result obtained in step S7 (S8).

On the other hand, the facility information providing apparatus 300 requests the facility information storing unit 200 to search underground facility information using the search region that is a result obtained in step S5 and receives the searched underground facility information from the facility information storing unit 200 (S9).

Thereafter, the facility information providing apparatus 300 corrects the underground facility that is a result obtained in step S9 using the corrected manhole information that is a result obtained in step S8 (S10).

Finally, the facility information providing apparatus 300 synthesizes the location information, the posture information, the image information, the corrected manhole information, and the corrected facility information and provides the synthesized information to the display unit 400 so that the display unit 400 may display the synthesized information in an augmented reality manner (S11). Of course, the facility information providing apparatus 300 stores to a storing unit (not shown) the manhole image, the manhole image central point, the manhole image central point geographic coordinate, the manhole image central point topology, the corrected manhole information, and the corrected facility information that are results obtained by synthesizing the information.

As described above, the present invention may provide augmented underground facility information based on site information by acquiring the site information including location information, posture information, and image information, extracting manhole information based on the site information, mapping stored manhole information and underground facility information with the site information to provide corrected information.

Further, the present invention may provide underground facility information conforming to the site information by performing mapping on the underground facility information based on the site information to correct the information rather than by simply synthesizing the site information with the underground facility information to display the simply synthesized information, thus providing inaccurate information.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. A facility information providing apparatus comprising:
   a site information analyzing unit that analyzes site information to identify a site facility;
   a facility information searching unit that retrieves facility information corresponding to the site information;
   a facility information mapping unit that maps the facility information with the site facility and corrects the facility information based on a mapped result to generate corrected facility information; and
   an augmented reality providing unit that synthesizes the corrected facility information with the site information to generate augmented reality information.

2. The apparatus of claim 1, wherein the site information includes location information, posture information, and image information.

3. The apparatus of claim 2, wherein the facility information includes manhole information and underground facility information.

4. The apparatus of claim 3, wherein the site facility includes a manhole, and
   the site information analyzing unit determines a geospatial coordinate using the location information, posture information, and image information of the manhole to configure a geographic coordinate-based topology of the manhole.

5. The apparatus of claim 4, wherein the facility information searching unit retrieves manhole information using the location information and posture information for the manhole and configures manhole information-based topology of the manhole based on the manhole information.

6. The apparatus of claim 5, wherein the facility information mapping unit maps the geographic coordinate-based topology of the manhole and the manhole information-based topology of the manhole to each other to generate corrected manhole information.

7. The apparatus of claim 6, wherein:
the site facility includes an underground facility,
the facility information searching unit retrieves underground facility information using location information and posture information of the underground facility, and
the facility information mapping unit maps the corrected manhole information with the underground facility information to generate corrected underground facility information.

8. The apparatus of claim 2, wherein the facility information mapping unit determines a search region using the location information and the posture information, and
the facility information searching unit retrieves facility information based on the search region.

9. The apparatus of claim 3, wherein the underground facility information includes information on a water supply facility, a sewage facility, an electrical facility, a gas facility, a communication facility, an oil pipeline, and a room heating pipeline, and the manhole information corresponds to the underground facility information.

10. The apparatus of claim 4, wherein the geospatial coordinate is determined by extracting a central point of the manhole using location information, posture information, and image information for the manhole and determining the geospatial coordinate from the central point of the manhole.

11. A method of providing facility information comprising:
analyzing site information using a processor to identify a site facility;
retrieving facility information corresponding to the site information;
mapping the facility information with the site facility and correcting the facility information based on a mapped result to generate corrected facility information; and
synthesizing the corrected facility information with the site information to generate augmented reality information.

12. The method of claim 11, wherein the site information includes location information, posture information, and image information.

13. The method of claim 12, wherein the facility information includes manhole information and underground facility information.

14. The method of claim 13, wherein the site facility includes a manhole, and
the analyzing site information to identify the site facility includes determining a geospatial coordinate based on location information, posture information, and image information for the manhole to configure geographic coordinate-based topology of the manhole.

15. The method of claim 14, wherein retrieving the facility information includes retrieving manhole information using location information and posture information for the manhole and configuring manhole information-based topology of the manhole based on the manhole information.

16. The method of claim 15, wherein the corrected facility information is generated by mapping the geographic coordinate-based topology of the manhole and the manhole information-based topology of the manhole to each other.

17. The method of claim 16, wherein the site facility includes an underground facility, and retrieving the facility information includes retrieving underground facility information using location information and posture information of the underground facility, and the corrected facility information is generated by mapping the corrected manhole information with the underground facility information to generate corrected underground facility information.

18. The method of claim 12, further comprising determining a search region using the location information and the posture information, and
retrieving the facility information includes retrieving the facility information based on the search region.

19. The method of claim 13, wherein the underground facility information includes information on a water supply facility, a sewage facility, an electrical facility, a gas facility, a communication facility, an oil pipeline, and a room heating pipeline, and
the manhole information corresponds to the underground facility information.

20. The method of claim 14, wherein the geospatial coordinate is determined by extracting a central point of the manhole using location information, posture information, and image information for the manhole and determining the geospatial coordinate from the central point of the manhole.

* * * * *